Patented Oct. 5, 1954

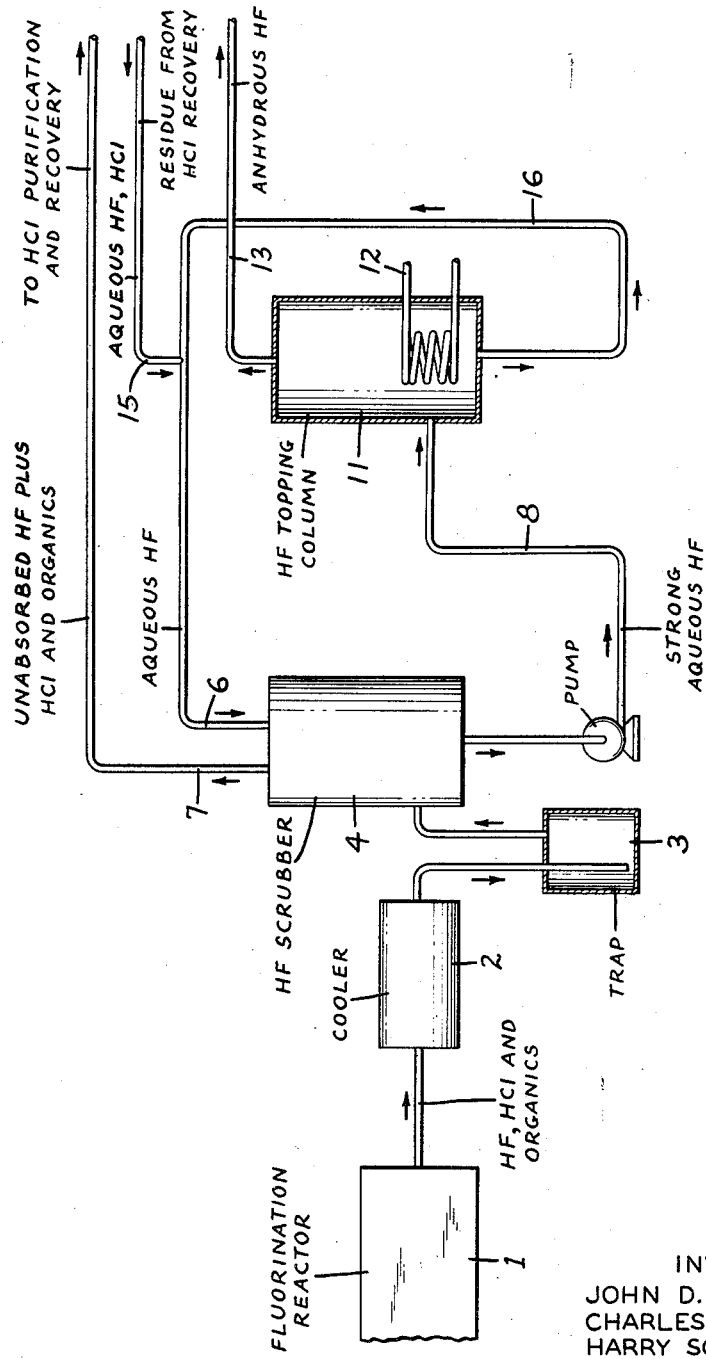

2,690,815

UNITED STATES PATENT OFFICE 2,690,815

RECOVERY OF HF

John D. Calfee, Dayton, Ohio, Charles B. Miller, Lynbrook, N. Y., and Harry Schneider, Oakland, Calif., assignors to Allied Chemical & Dye Corporation, New York, N. Y., a corporation of New York Application August 8, 1951, Serial No. 240,820

2 Claims. (Cl. 183—115)

This invention relates to recovery of hydrofluoric acid from gaseous mixtures containing hydrofluoric acid and hydrochloric acid, particularly from mixtures comprising HF, HCl and organic material.

In carrying out commercially important procedures involving use or formation of HF, it is frequently desired to effect removal of HF from other material, e. g. HCl. For example, in fluorination reactions, particularly the substitution of chlorine by fluorine in chlorinated organic compounds using HF as a fluorinating agent, appreciable amounts of HF may pass through the reactor without undergoing the desired reaction. The HF in the rector effluent stream is usually mixed with substantial amounts of difficulty condensable organic material and HCl, the latter compound being formed as by-product in fluorination. Due to similarity in properties, it is very difficult to separate and recover HF from HCl by usual procedures. In instances where substantial amounts of HF so pass through the reactor, it may be economical to recover such HF and, in fact, the overall process may be rendered uneconomical if HF is not recovered. It has been proposed to effect separation of HF, HCl and organic fluorinated products by condensing the mixture under high pressure and thereafter distilling under high pressure. The disadvantages of high pressure condensation-distillation procedure are self-evident.

The broad object of the present invention is to develop an effective and economical procedure for recovery of HF from gaseous mixtures containing HF and HCl. A particular object is to obtain from such mixtures anhydrous HF, e. g. in substantially pure form.

According to our present invention, the foregoing objects are realized by contacting the gas comprising HCl and a substantial amount of HF (i. e. any quantity worth recovering) with aqueous hydrofluoric acid solution under conditions more fully set forth herein which bring about absorption of the desired amount of HF from said gas without absorption of undue amounts of HCl, and production of a gas having HF content appreciably lower than that initially contacted with the liquid.

We have found that the aqueous hydrofluoric acid employed as absorbent according to the present process substantially selectively dissolves HF from the gas stream (depending to some extent upon relative vapor pressure in the gas, as more fully described below) in many cases permitting HCl and organics to pass through the liquid substantially undissolved, i. e. that the solubility of gaseous HF in aqueous hydrofluoric acid is much greater than the solubility of HCl and organics therein, and therefore the proportion of gaseous HF absorbed into the liquid is greater than the proportion of HCl or of organics absorbed.

Advantages accrue according to our HF recovery procedure, if aqueous hydrofluoric acid employed as absorbent has HF strength at least as great as the azeotropic composition (about 35% by weight or about 33 mol percent HF) and such acid is contacted with the HF gas. Although preferred absorbents contain HF in concentration at least as great as the azeotrope, aqueous hydrofluoric acids substantially below azeotrope composition also possess selective relative insolubility of HCl as compared with the HF. As HF concentration increases such relative insolubility of HCl increases substantially, that is the effectiveness of the aqueous hydrofluoric acid in selectively removing HF as compared with HCl from the gas increases. The particular absorbent HF strength utilized in a given operation will depend mainly on the HF concentration in the gas to be treated. As HF strength of the aqueous absorbent increases, the HF vapor pressure above such absorbent also increases and therefore, to provide adequate driving potential for absorption, hydrofluoric acid absorbent having HF vapor pressure appreciably below the partial pressure of the HF in the gas in contact therewith will be selected.

Although as indicated above, particular advantages are realized by contacting aqueous hydrofluoric acid of HF strength of the azeotropic composition or above with gas, it is within the scope of this embodiment of the invention to begin absorption of HF with absorbent of lower HF strength and continue contact of such absorbent with HF gas until the liquid HF concentration has increased to above the azeotropic composition.

A particular feature and advantage of the present invention is recovery of anhydrous HF. Such recovery may be obtained by maintaining gas-liquid contact for time sufficiently long and in the presence of a sufficient quantity of gas to produce hydrofluoric acid solution of HF strength greater than the azeotropic composition (preferably using azeotropic or stronger solution as feed liquor for absorption) and then subjecting the absorbing liquid, enriched by the absorbed HF, to distillation, preferably fractional distillation. Gaseous, substantially anhydrous HF is removed as overhead while the still bottoms, which may approach the azeotropic composition, are recycled as absorbing liquid to effect further recovery and removal of HF from the gas undergoing treatment.

As HF concentration increases above the azeotrope, HCl solubility decreases to a remarkable and unexpected degree. Hence, by effecting absorption of HF into solution having sufficiently high HF strength any desired low concentration of HCl may be obtained. In concentration above about 60% HF, aqueous hydrofluoric acid has substantially no absorptive properties for HCl, i. e. the enrichment ratio for HCl (defined below) is nearly zero. This means that by employing aqueous 60% HF as absorbent for HF-HCl gases (at suitable gas composition-vapor pressure-temperature relationships) the absorber effluent may be distilled to produce substantially pure anhydrous HF. The latter operations form preferred embodiments of the invention. For instance, in Example 4 below or operation according to equilibrium data of run 2 of Table 1, fractional distillation of the liquid will produce an overhead distillate consisting of substantially pure anhydrous HF.

Product gases obtained in fluorination reactions may vary in HF content depending upon completeness of fluorination, i. e. percent conversion of starting material to all products. The present process is broadly applicable to recovery of HF from gases containing any worth while recoverable amount of HF. However, our process is most advantageously applied to recovery of HF from gases containing at least about 5 mol percent HF. There is no upper limit of HF concentration. However, advantagewise, our process compares most favorably with alternative prior art procedures when recovering HF from gases below about 80% HF strength.

It is preferred to maintain the temperature in the zone of contact of gas and liquid as low as practically feasible, since lower temperatures favor the separability of HF from HCl when using our aqueous hydrofluoric acid absorbent. An additional factor favoring low absorption temperatures is that the vapor pressure of HF in the liquid is decreased, thereby increasing the absorption driving potential between gas and liquid. Temperatures will be maintained sufficiently low in the absorbing zone to maintain the HF vapor pressure of the liquid absorbent appreciably below the partial pressure of HF in the gas. In order to effect substantial absorption of HF from, e. g. the 5 mol percent HF gas mentioned above into aqueous HF of about the azeotropic composition, absorption temperature at least as low as about 30° C. should be utilized. Although a statement of operating temperature broadly will be determined by many factors and temperature for a particular operation may be best selected after other operating variables are fixed, in general absorbing temperatures of about 50° C. and below will be found to be satisfactory. To obtain facility of operation, absorbing temperatures above about minus 20° C. are preferred. Desired absorber temperature control may be obtained, e. g. by cooling the tower feed streams and/or installation of appropriate internal heat transfer surfaces in the tower.

As previously indicated, it is an advantage of the present process as compared with prior art procedures for recovering HF, that operations can be carried out at atmospheric pressure. However, pressures higher or lower than atmospheric may be maintained, if desired. The general overall effect of higher pressure will be to increase rate of absorption, making feasible the use of aqueous hydrofluoric acid absorbent of higher HF concentration, or use of higher operating temperatures.

The following equilibrium data are illustrative of the selectivity of the aqueous hydrofluoric acid absorbent utilized for recovery of gaseous HF according to the present invention.

Table 1

| Run No. | Temp., °C. | Compositions, Mol Percent | | | | Enrichment Ratios | |
|---|---|---|---|---|---|---|---|
| | | Vapor* | | Liquid | | | |
| | | HF | HCl | HF | HCl | HF | HCl |
| 1 | 0 | 1.6 | 98.4 | 48.5 | 10.8 | 51 | .19 |
| 2 | 0 | 3.3 | 96.7 | 60.5 | Trace | 30 | negl. |
| 3 | 0 | 17.8 | 82.2 | 78.6 | 0 | 5.6 | 0 |
| 4 | 32 | 9.1 | 90.9 | 43.2 | 5.8 | 9.7 | .13 |
| 5 | 37.8 | 10.5 | 89.5 | 42.2 | 5.8 | 8.4 | .14 |
| 6 | 37.8 | 11.5 | 88.5 | 44.0 | 5.3 | 7.8 | .12 |
| 7 | 37.8 | 18.5 | 81.5 | 56.3 | 1.3 | 5.3 | .03 |
| 8 | 37.8 | 2.2 | 97.8 | 23.5 | 13.5 | 28.8 | .37 |
| 9 | 32 | 4.5 | 95.5 | 28.8 | 11.6 | 15.8 | .30 |

*Water vapor neglected.

The foregoing data show, e. g. that at 37.8° C. liquid containing 42.2 mol percent HF and 5.8 mol percent HCl will produce, by scrubbing a feed gas to equilibrium conditions a gas containing only 10.5 mol percent HF and 89.5 mol percent HCl. Similarly, at 0° C. a liquid containing 60.5 mol percent HF and a mere trace of HCl will produce, by scrubbing a feed gas to equilibrium conditions a gas containing only 3.3% HF and 96.7% HCl. By using absorbent below the azeotropic HF strength (run 8 or 9) similar trends will be observed. For example, scrubbing at 32° C. with aqueous 28.8% HF and 11.6% HCl will produce a gas approaching 95.5% HCl and only 4.5% HF.

The concept of enrichment ratio has been used to express tendency of a given constituent of a gas mixture to be absorbed by liquid. The enrichment ratio of HF is calculated as the ratio of mol fraction of HF (based on HF plus HCl) in the liquid to such fraction for the gas. Similarly, the enrichment ratio for HCl is the ratio of mol fraction of HCl (based on HF plus HCl) in the liquid to such fraction for the gas. Enrichment ratios calculated from the above equilibrium data appear in the columns to the right in the above Table 1. It is seen that HF enjoys high values of enrichment ratio as contrasted with low values for HCl corresponding therewith. This contrast is a measure of difference in solubility and, hence, ease of separation of these two compounds using the process of our invention.

Our invention may be carried out by introducing a gas stream containing HCl and a substantial amount of HF into an absorbing zone, introducing a stream of aqueous hydrofluoric acid absorbent into said zone, contacting said gas and said liquid in said zone to effect absorption of at least part of the HF from the gas into the liquid, as indicated above, and separately withdrawing liquid and gas streams. Countercurrent contact of the liquid and gas streams generally affords enhanced results. Although not limited to continuous operations, the process of this invention is advantageously carried out thereby. In feasible, though less preferred, embodiments of the invention the aqueous hydrofluoric acid introduced into the absorbing zone may be of HF strength substantially weaker than the azeotropic composition, the important feature in obtaining the advantages indicated above being to control the HF strength and temperature of the absorbent so that the vapor pressure of HF above the liquid at every point in the absorber is less than the partial pressure of HF in the gas stream in contact with such liquid and to retain the absorbent in the zone until sufficient HF has been absorbed from the gas to build up liquid HF strength sufficient to produce absorbing zone liquid effluent appreciably above the azeotropic composition. The time of contact between gas and liquid in continuous or non-continuous embodiments of the invention is sufficient to effect the desired removal of HF from the gas stream and increase in HF strength of the liquid absorbent to appreciably above the azeotropic concentration.

The successive stages of operation may be conveniently understood by reference to the attached Figure 1. The gas stream effluxing the fluorination reactor 1, which stream may be found to comprise, e. g. 5 to 20 mol percent HF, generally a greater amount of HCl than HF, and gaseous organic material, may be cooled in cooler 2, if desired, passed through trap 3 to separate any condensate and thereafter continuously introduced into the bottom of HF scrubber 4. Simultaneously, strong aqueous hydrofluoric acid of, e. g. 40% HF content is introduced continuously into the top of HF scrubber 4 through pipe 6. Scrubber 4 is of design which permits time of contact between the gas and liquid streams to effect the desired degree of HF removal from the gas and HF enrichment of the liquid. Scrubber temperature may suitably be maintained in the range 0 to 30° C., depending somewhat upon the HF concentration of the inlet gas stream. Scrubbed gas comprising principally HCl and organics and possibly small amounts of unabsorbed HF effluxes the top of the scrubber through pipe 7. These effluent gases, if desired, may be conveyed to suitable apparatus not shown, for recovery and purification of HCl and organic material. The liquid effluent of scrubber 4, which has HF strength appreciably higher than the HF strength of the absorbent introduced through pipe 6, is removed from the bottom and conveyed through pipe 8 into HF topping column 11 heated by means of steam coil 12 and operated as known in the art to produce anhydrous HF. Substantially anhydrous HF flows from the top of the column through pipe 13 and, if desired, may be recycled through fluorination reactor 1 through pipes not shown, or may be condensed. The bottoms from distilling column 11, the HF strength of which depends upon the design and operation of said column, e. g. about 40% HF in the particular operation described, are recycled through pipes 16 and 6 to the top of HF scrubber 4 for further absorption of gaseous HF, thereby completing the cycle of operation.

In the HCl recovery and purification procedure referred to in the preceding paragraph, the small amounts of unabsorbed gaseous HF effluxing scrubber 4 may be concentrated in still bottoms, e. g. by absorbing the HF or HF plus some HCl in aqueous HCl absorbent and distilling off more volatile HCl leaving HF concentrated in the residue. According to a particular embodiment of the present invention this HF is recovered by introducing said residue (containing HF and HCl) into the HF recovery system of the present invention, e. g. through pipe 15 into pipe 16 or 6 with the recycle aqueous HF to the scrubber. HCl tends to pass overhead to the HCl recovery system aforesaid, while HF tends to remain in the liquid phase to be recovered via topping column 11 and pipe 13.

Equipment of design suitable for effecting the desired operations is selected, e. g. absorption and distillation to produce acceptable HF recovery in view of the nature and concentration of starting materials. Equipment is constructed of material known to withstand chemical attack of products and reactants under the temperature conditions maintained.

Following is an example of one operation of the process of our invention, the parts being by weight except where otherwise indicated.

*Example 1*

A gas stream effluxing a fluorination reactor fed with HF and CCl₄ in mol ratio 1.2 HF/CCl₄ is passed through a condenser maintained at about 0° C. to remove easily condensed material (e. g. CCl₄ and CCl₃F) from the gas. The condenser effluent consisting of 7% HF, 64% HCl and 29% uncondensed organic material (by volume) is introduced at the rate of 100 parts per hour HF plus HCl directly into the bottom of an absorbing or scrub tower fed at the top with aqueous hydrofluoric acid absorbent of 45 mol per cent HF strength maintained at 0° C. at the rate of 80 parts per hour. The absorbing tower is designed so as to produce exit unabsorbed gas at the top consisting of about 65.5 mol per cent HCl, about 32 mol per cent organic material and 2.4 mol per cent HF which is withdrawn at the rate of 87 parts per hour of HF plus HCl. The scrubbing liquid effluent of the tower, withdrawn at the rate of 92 parts per hour, containing about 45 mol per cent HF and 5 mol per cent HCl is thereafter introduced into a fractionating column and product consisting of about 12.1 parts per hour of substantially anhydrous material (47% HF, 53% HCl by volume) removed overhead which may be fractionally condensed to produce about 4.1 parts of liquid anhydrous HF and about 8 parts of gaseous HCl which may be recirculated to the gases exiting the scrub tower. Distillation residue consists of 70 parts per hour of aqueous hydrofluoric acid having 45% HF content and is suitable for reuse as absorbent in further HF recovery operations. Of the total HF introduced into the scrubber in the inlet gas stream, 70% is recovered as anhydrous HF, the balance being recoverable from the scrubber off-gas by returning HCl still bottoms through pipe 15 as described above.

*Example 2*

HF and HCl in 1:1 molar ratio were passed at the rate of 5 mols of HF plus HCl per hour into a scrubber containing 44 mol percent aqueous HF as scrubbing liquid while maintaining liquid temperature at 0° C. by external cooling. A stream of gaseous nitrogen was introduced into the scrubber exit gas stream in order to sweep exit HF and HCl into a water absorber for quantitative absorption of both HF and HCl for analytical purposes. Introduction of gas was continued until the concentration of HF in the liquid had increased to 47.5 mol percent. Analysis of the scrubber exit gas and the scrubber solution gave the following results expressed on mol basis:

| Vapor | | Liquid | | Enrichment Ratio | |
|---|---|---|---|---|---|
| HF | HCl | HF | HCl | HF | HCl |
| 1.7 | 98.3 | 47.5 | 11.0 | 48 | .19 |

Example 3

HF and HCl in 1:1 molar ratio were passed at the rate of 5 mols of HF plus HCl per hour into a scrubber containing 55 mol percent aqueous HF as scrubbing liquid while maintaining liquid temperature at 0° C. by external cooling. A stream of gaseous nitrogen was introduced into the scrubber exit gas stream in order to sweep exit HF and HCl into a water absorber for quantitative absorption of both HF and HCl for analytical purposes. Introduction of gas was continued until the concentration of HF in the liquid had increased to 60.5%. Analysis of the scrubber exit gas and the scrubber solution gave the following results expressed on mol basis:

| Vapor | | Liquid | | Enrichment Ratio | |
|---|---|---|---|---|---|
| HF | HCl | HF | HCl | HF | HCl |
| 3.3 | 96.7 | 60.5 | 1.0 | 30 | .017 |

Example 4

HF and HCl in 1:1 molar ratio were passed at the rate of 5 mols of HF plus HCl per hour into a scrubber containing 73 mol percent aqueous HF as scrubbing liquid while maintaining liquid temperature at 0° C. by external cooling. A stream of gaseous nitrogen was introduced into the scrubber exit gas stream in order to sweep exit HF and HCl into a water absorber for quantitative absorption of both HF and HCl for analytical purposes. Introduction of gas was continued until the concentration of HF in the liquid had increased to 78.6%. Analysis of the scrubber exit gas and the scrubber solution gave the following results expressed on mol basis:

| Vapor | | Liquid | | Enrichment Ratio | |
|---|---|---|---|---|---|
| HF | HCl | HF | HCl | HF | HCl |
| 17.5 | 82.5 | 78.6 | negl. | 5.7 | negl. |

Fractional distillation of this liquid will produce an overhead distillate consisting of substantially pure anhydrous HF. The high HCl (contrasted with HF) gas concentrations and the high values of enrichment ratio for HF compared to the relatively low values for HCl in Examples 2, 3 and 4 are indicative of the ability of the aqueous HF solutions of the present invention to effect separation and recovery of HF from gaseous HF-HCl mixtures.

We claim:

1. The process of preparing substantially anhydrous HF which comprises contacting, at temperature below about 30° C., a gas containing HCl and at least 5 mol percent HF with aqueous hydrofluoric acid solution of HF strength above about 60 mol percent, controlling the HF strength and temperature of said solution so that the vapor pressure of HF above said solution is less than the partial pressure of HF in said gas, continuing gas-liquid contact for time sufficiently long and in the presence of a sufficient quantity of gas to absorb sufficient of said gaseous HF into said solution to produce an aqueous hydrofluoric acid solution of HF strength substantially greater than 60 mol percent and of substantially no HCl content, and fractionating the resulting hydrofluoric acid solution to distill substantially anhydrous HF gas therefrom.

2. The process of preparing substantially anhydrous HF which comprises continuously introducing a gas stream comprising HCl and at least about 5 mol percent of HF into the bottom of an absorbing zone, continuously introducing as feed into the top of said zone a stream of aqueous hydrofluoric acid solution of HF strength above about 60 mol percent, contacting liquid and gas streams countercurrently in said absorbing zone at temperature below about 30° C. while controlling the HF strength and temperature of said solution so that the vapor pressure of HF above said solution at every point in said zone is less than the partial pressure of HF in the gas stream in contact therewith, continuing said gas-liquid contact for time sufficient to absorb a substantial part of said gaseous HF and form a liquid absorbent of substantially increased HF content and of substantially no HCl content, continuously withdrawing unabsorbed gas stream from the top of said zone, continuously withdrawing said liquid stream from the bottom of said zone, heating said withdrawn liquid to distill therefrom substantially anhydrous HF and form a distillation residue having about the HF concentration of said absorbing zone feed, recovering substantially anhydrous HF, and recycling said distillation residue to the top of said absorbing zone as absorbent feed.

References Cited in the file of this patent

UNITED STATES PATENTS

| Number | Name | Date |
|---|---|---|
| 2,282,712 | Engs | May 12, 1942 |
| 2,306,184 | Pechukas | Dec. 22, 1942 |
| 2,311,466 | Pechukas | Feb. 16, 1943 |
| 2,345,696 | Benning et al. | Apr. 4, 1944 |
| 2,392,048 | Kassel | Jan. 1, 1946 |
| 2,591,096 | Penick | Aug. 11, 1952 |